UNITED STATES PATENT OFFICE.

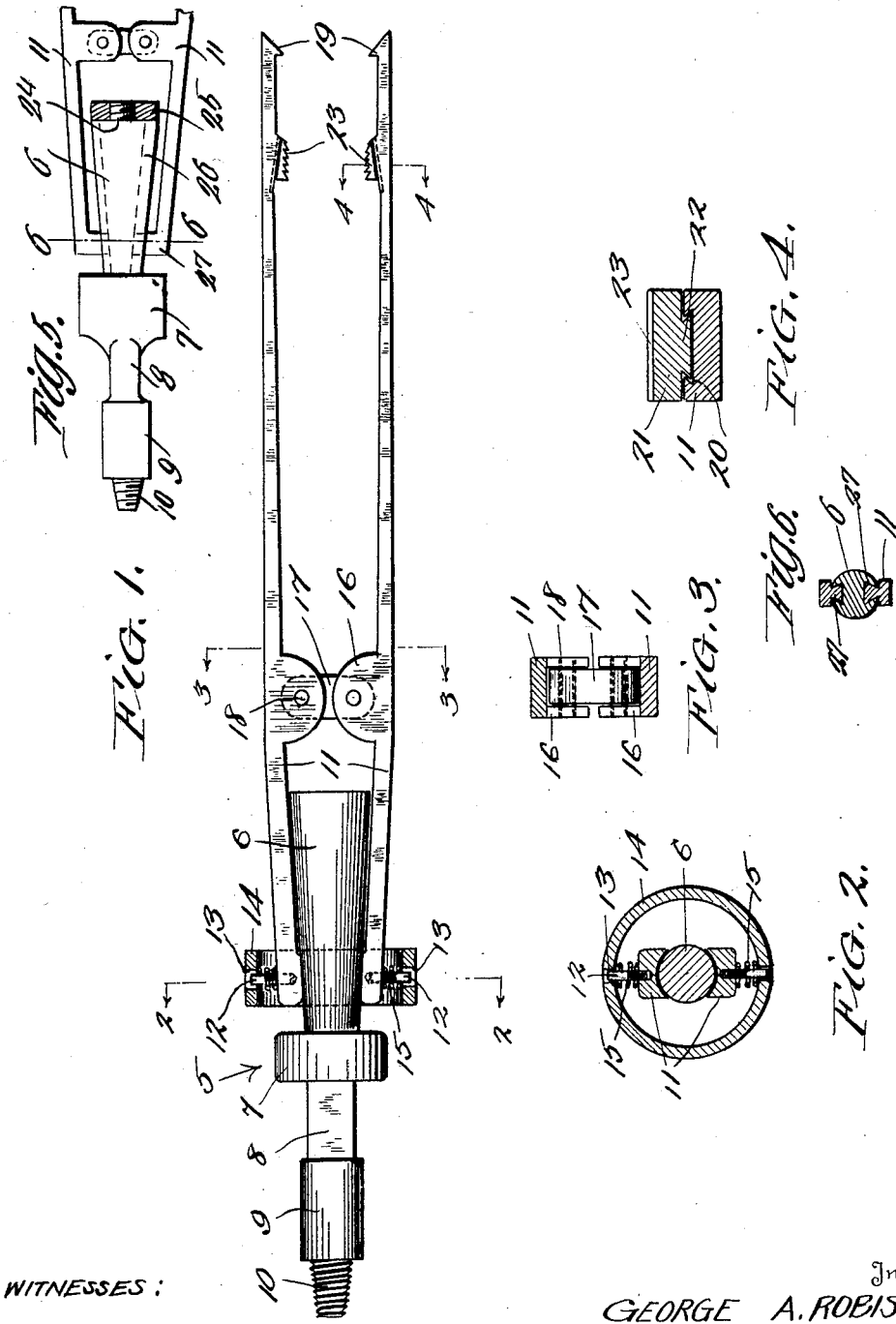

GEORGE A. ROBISON, OF FELLOWS, CALIFORNIA.

FISHING TOOL.

1,409,197.  Specification of Letters Patent.  Patented Mar. 14, 1922.

Application filed February 5, 1920. Serial No. 356,536.

*To all whom it may concern:*

Be it known that I, GEORGE A. ROBISON, a citizen of the United States, residing at Fellows, in the county of Kern and State of California, have invented certain new and useful Improvements in Fishing Tools, of which the following is a specification.

This invention relates to new and useful improvements in fishing tools, and the primary object of the invention is to provide a device of this nature including a pair of gripping arms which automatically separate in engaging an object to be lifted or raised from a well or the like.

Another important object of the invention is to provide a device of this nature including means whereby the gripping portions of said arms are normally urged apart when the grapple has been lowered to engage the object to be raised.

Another object of the invention is to provide a device of this nature including a pair of articulated gripping arms so connected and constructed, that the gripping portions of the arms are arranged in approximately parallel and spaced relation.

Another object of the invention is to provide a grapple including gripping slides which are automatically adjusted to the size of the object gripped.

Other objects and advantages of the invention will become apparent during the course of the following description.

In the accompanying drawings forming a part of the description and wherein like numerals are employed to designate like parts through the several views:—

Figure 1 is a side elevation of the invention, parts of the same being broken away.

Figure 2 is a transverse section taken on line 2—2 of Fig. 1,

Figure 3 is a transverse section through the articulated jaws taken on the line 3—3 of Fig. 1, and Figure 4 is an enlarged transverse section through one of the sliding grips showing the manner of mounting the same upon the gripping arm.

Figure 5 is a fragmentary side elevation of a modified form of the invention.

Figure 6 is a transverse section taken on the line 6—6 of Fig. 5.

In the drawings, wherein for the purpose of illustration is shown preferred embodiments of the invention, the numeral 5 designates a controlling member in its entirety, and which assumes the form of a conical wedge for actuating a pair of articulated jaws to be hereinafter set forth. The controlling member 5 consists of a conical shaped lower end 6 thereby providing a wedge. An enlargement or collar 7 is carried by the upper end of the wedge 6, and extending therefrom axially from the wedge 6 is a squared shank 8 terminating in a cylindrical portion 9 and a tapered threaded terminal 10 whereby the device may be attached to suitable lowering elements.

In the form illustrated in Figs. 1, 2, 3 and 4 the conical shaped portion of wedge 6 is interposed between the upper ends of a pair of articulated gripping arms 11 as more clearly shown in Figure 2. The inner surfaces of the upper ends of the gripping arms engage with the wedge 6 and a pin 12 is screw-threaded into the upper end of each arm in such a manner that the two pins 12 extend outwardly and are disposed oppositely one another. These pins extend through diametrically arranged openings 13 in a collar 14, which surrounds the upper ends of the gripping arms in spaced relation thereto. A coil spring is mounted upon each pin to engage the gripping arms and the collar 14 whereby the upper ends of the gripping arms are normally urged inwardly toward each other to cause the lowermost gripping ends to be urged apart to readily engage with the object to be raised. Due to this construction, it will also be manifest that the upper ends of the gripping arms are always maintained in contact with the wedge 6 whereby any movement of the wedge will actuate the arms.

At a point a substantial distance from the upper end of each arm, a pair of apertured oppositely disposed ears are carried by each gripping arm. A fulcrum link is interposed between the two pairs of ears 16 and is pivotally connected with each pair of ears through the medium of fulcrum pins 18. By this construction, it will be seen that the gripping arms are maintained in spaced relation whereby objects of varying sizes may be efficiently engaged thereby.

The lower extremity of each gripping arm is provided with an inwardly extending pointed gripping jaw 19. Spaced a slight distance above the gripping jaws 19, each arm is equipped with a downwardly and inwardly extending dove-tailed recess 20 as most clearly shown in Fig. 1. Operable in each dove-tailed recess 20 is a gripping slide 21 having a dove-tailed engaging tongue 22 thereon to be slidably engaged with each respective dove tailed recess in either gripping arm 11. The relative inner face of each slide is serrated to provide upwardly projecting teeth 23 whereby an effective grip is obtained upon the article being raised.

In view of the arrangement of the gripping jaws 19 and the slides 21 taken in connection with the operation of the latter, it will be manifest that the object being raised is engaged in four different places thereby assuring the grapple of an effective grip thereon.

To use the implement, it is attached to a suitable lowering apparatus, not shown, through the medium of the tapering threaded portion 10 after which the grapple is lowered into the well or other opening. As the implement is making its descent the upper ends of the gripping arms are maintained in contact with the relative smallest end of the wedge 6 through the medium of the coil springs 13, it being understood that the pins 12 operate through the openings in the collar 14. When the gripping jaws 19 of the articulated arms 11 engage the bottom of the well or the object to be raised, and the object passes between the jaws 19, this engagement causes the lower ends of the gripping jaws to separate while the upper ends thereof are drawn closer together, it being understood that the wedge 6 has dropped between the arms to such an extent that the collar 7 engages with the upper ends of the arms to limit the downward movement of the wedge. The coil springs 13 also assist in urging the upper ends of the gripping arms together, which action, of course, separates the lower ends of the arms 11. The grappling tool is, of course, lowered into the well or opening sufficiently to permit the object to be raised to pass well up between the gripping arms 11. During the object's ascent, it engages the gripping slides 21 and causes them to move upwardly and outwardly of the gripping arms, or in other words, to separate to more easily accommodate the object to be raised therebetween. Therefore, as the grapple is elevated, the wedge 6 will be caused to move upwardly of the arms to separate the upper ends thereof and to cause the lower ends thereof to move inwardly of each other to more securely engage the gripping jaws 19 with the article to be raised. As the object is being elevated, and its weight is imposed upon the grapple, the sliding grips 21 will be caused to move downwardly and inwardly of the gripping arms to obtain a firmer grip upon the object. Therefore, it will be manifest that there is absolutely no possibility of the object becoming detached from the grapple while it is being elevated.

In the modified form of invention illustrated in Figs. 5 and 6, the free end of the wedge 6 is equipped with a reduced axially extended threaded shank upon which is mounted a nut 25 for a purpose which will presently appear. The wedge 6 is further provided with a pair of oppositely disposed longitudinally extending dove-tailed grooves 26 which extend from one edge of the wedge to the other, the outer ends of the grooves being closed by the nut 25. The upper ends 27 of the arms 11 are extended inwardly toward the ridge and are dove-tailed in formation to be received and slidably mounted within the dove-tailed grooves 26 of the wedge.

The operation of this modified form is as follows: When the tool is lowered to grapple for an object, the weight of the arms 11 will cause them to move downwardly until the ends 27 thereof are engaged with the nut 25 which prevents further downward movement of the arms. When the lower ends of the arms engage the object to be elevated, the inclined ends 19 of the arms will slide upon the object and cause the lower ends of the arms to separate whereby a grip may be obtained upon the object. The arms 11, of course, move upwardly as the object is gripped whereby the ends 27 of the arms may ride upwardly of the wedge to be disposed adjacent the smallest portion thereof. When the tool is elevated, the wedge 6 moves upwardly of the arms until the extensions 27 of the latter bind in the grooves 26, which action, of course, causes the lower ends of the arms to firmly grip the object. As the tool is elevated further, the slides 21 operate upon the object in the manner set forth for the preceding form of invention.

It is to be understood that the form of my invention herein shown and described is to be taken as a preferred example of the same and that various changes in the shape, size and arrangement of parts may be resorted to without departing from the spirit of the invention or the scope of the appended claims.

Having thus fully described my invention what I claim as new and desire to secure by Letters Patent, is:—

1. A grapple comprising a pair of gripping arms, a single fulcrum link arranged between the jaws and pivotally connected at its opposite ends directly to said jaws to form a fulcrum for the jaws, and means for causing the lower ends of said arms to grip an object.

2. In a grapple, a pair of articulated oppositely disposed arms, each being provided with a downwardly and inwardly inclined recess, a slide in each recess provided with a plurality of teeth, and means for operating said arms to grip an object.

3. A grapple comprising a pair of articulated gripping arms, a wedge interposed between said arms for operating the latter, said wedge being provided with a groove, and one of said arms having a portion thereof operating in said grooves.

4. A grapple comprising a pair of articulated gripping arms, a wedge interposed between said arms for operating the latter, said wedge being provided with longitudinally extending dove-tailed a groove, and one of the upper ends of said arms having dove-tailed extensions for engagement with said grooves.

5. A grapple comprising a pair of articulated gripping arms, a wedge interposed between said arms for operating the latter, said wedge being provided with longitudinally extending grooves, the lower end of said wedge being reduced and screw threaded, a nut on said reduced end to close the lower ends of said grooves, and said arms having portions thereof operating in said grooves.

In testimony whereof I affix my signature in presence of two witnesses.

GEORGE A. ROBISON.

Witnesses:
W. T. AITKEN,
R. P. AMADISTO.